United States Patent
DiBenedetto

(10) Patent No.: US 10,927,706 B2
(45) Date of Patent: Feb. 23, 2021

(54) INTERCOOLED TANGENTIAL AIR INJECTOR FOR GAS TURBINE ENGINES

(71) Applicant: UNITED TECHNOLOGIES CORPORATION, Farmington, CT (US)

(72) Inventor: Enzo DiBenedetto, Berlin, CT (US)

(73) Assignee: Raytheon Technologies Corporation, Farmington, CT (US)

(*) Notice: Subject to any disclaimer, the term of this patent is extended or adjusted under 35 U.S.C. 154(b) by 177 days.

(21) Appl. No.: 16/177,991

(22) Filed: Nov. 1, 2018

(65) Prior Publication Data

US 2020/0141272 A1 May 7, 2020

(51) Int. Cl.
*F01D 25/12* (2006.01)

(52) U.S. Cl.
CPC ...... *F01D 25/12* (2013.01); *F05D 2220/3219* (2013.01); *F05D 2260/205* (2013.01)

(58) Field of Classification Search
CPC .......... F01D 25/08; F01D 25/12; F01D 25/14; F01D 9/00; F01D 9/02; F01D 9/04; F01D 9/06; F01D 9/065; F01D 5/091; F05D 2220/3219; F05D 2260/20; F05D 2260/205; F05D 2260/208; F05D 2260/213; F02C 6/08; F02C 7/185
See application file for complete search history.

(56) References Cited

U.S. PATENT DOCUMENTS

| | | | |
|---|---|---|---|
| 2,812,897 A | 11/1957 | McTavish | |
| 4,079,587 A * | 3/1978 | Nordstrom | F01D 9/065 415/115 |
| 4,822,244 A | 4/1989 | Maier | |
| 5,685,158 A | 11/1997 | Lenahan | |
| 6,183,193 B1 | 2/2001 | Glasspoole | |
| 8,381,533 B2 | 2/2013 | Smoke | |
| 9,303,526 B2 | 4/2016 | Chir et al. | |
| 9,382,810 B2 | 7/2016 | Lacy et al. | |
| 9,777,634 B2 | 10/2017 | Drake et al. | |
| 9,822,797 B2 | 11/2017 | Boeck | |
| 2008/0041064 A1 | 2/2008 | Moore | |
| 2010/0275612 A1 | 11/2010 | Smoke | |
| 2015/0192072 A1 | 7/2015 | Hagan | |
| 2016/0022298 A1 | 1/2016 | Parihar | |
| 2016/0312615 A1 * | 10/2016 | Lyons | F02C 7/185 |
| 2018/0202362 A1 | 7/2018 | Bintz et al. | |

FOREIGN PATENT DOCUMENTS

WO  2015138031  9/2015

OTHER PUBLICATIONS

European Patent Office, European Search Report dated Mar. 20, 2020 in Application No. 19204521.9.

* cited by examiner

*Primary Examiner* — David E Sosnowski
*Assistant Examiner* — Danielle M. Christensen
(74) *Attorney, Agent, or Firm* — Snell & Wilmer L.L.P.

(57) ABSTRACT

A thermal management system for a component of a gas turbine engine is disclosed. In various embodiments, the thermal management system includes a manifold extending circumferentially about a longitudinal axis and defining a plenum; a cooling fluid transfer tube disposed within the plenum and configured to transfer a component cooling fluid from a component cooling fluid source to the component; and a cooling fluid passageway connected to the manifold and configured to transfer a plenum cooling fluid from a plenum cooling fluid source to the plenum.

13 Claims, 5 Drawing Sheets

INTERCOOLED TANGENTIAL AIR INJECTOR FOR GAS TURBINE ENGINES

FIELD

The present disclosure relates to gas turbine engines and, more particularly, to thermal management systems used in gas turbine engine compressors.

BACKGROUND

Gas turbine engines typically include a fan section, a compressor section, a combustor section and a turbine section. During operation, air is pressurized in the compressor section and mixed with fuel and burned in the combustor section to generate hot combustion gases. The hot combustion gases are then communicated through the turbine section, which extracts energy from the hot combustion gases to power the compressor section, the fan section and various other loads occurring within or proximate a gas turbine engine. Performance and efficiency improvements in gas turbine engine architectures are often accompanied by increases in compressor exit discharge pressures and temperatures, which are approaching the limits of material capabilities.

SUMMARY

A thermal management system for a component of a gas turbine engine is disclosed. In various embodiments, the thermal management system includes a manifold extending circumferentially about a longitudinal axis and defining a plenum; a cooling fluid transfer tube disposed within the plenum and configured to transfer a component cooling fluid from a component cooling fluid source to the component; and a cooling fluid passageway connected to the manifold and configured to transfer a plenum cooling fluid from a plenum cooling fluid source to the plenum. In various embodiments, the component is a rim section of a rotor of a high pressure compressor.

In various embodiments, the component cooling fluid source is disposed within a core flow of the high pressure compressor. In various embodiments, the component cooling fluid source is a plenum section disposed downstream of an exhaust guide vane. In various embodiments, the component cooling fluid source is disposed within a bypass flow of the gas turbine engine.

In various embodiments, the cooling fluid passageway extends through an exhaust guide vane. In various embodiments, the plenum cooling fluid source is disposed within a core flow of the high pressure compressor. In various embodiments, the plenum cooling fluid source is disposed upstream of the rotor. In various embodiments, the plenum cooling fluid source is disposed within a bypass flow of the gas turbine engine.

In various embodiments, the component cooling fluid source is disposed within a core flow of the high pressure compressor and the plenum cooling fluid source is disposed within a bypass flow of the gas turbine engine. In various embodiments, a heat exchanger is disposed within the bypass flow and configured to cool the component cooling fluid.

A compressor is disclosed. In various embodiments, the compressor includes a rotor configured to rotate about a longitudinal axis; a manifold extending circumferentially about the longitudinal axis and defining a plenum, the manifold disposed downstream of the rotor and radially inward of an exhaust guide vane; a cooling fluid transfer tube disposed within the plenum and configured to transfer a component cooling fluid from a component cooling fluid source to a component of the rotor; and a cooling fluid passageway extending through the exhaust guide vane and configured to transfer a plenum cooling fluid from a plenum cooling fluid source to the plenum.

In various embodiments, the cooling fluid transfer tube includes a first axial cooling tube end and a second axial cooling tube end. In various embodiments, the component of the rotor is a rim section. In various embodiments, the component cooling fluid source is disposed within a core flow of the compressor and the plenum cooling fluid source is disposed within a bypass flow of a gas turbine engine. In various embodiments, a heat exchanger is disposed within the bypass flow and configured to cool the component cooling fluid.

A method of cooling a component within a compressor of a gas turbine engine is disclosed. In various embodiments, the method includes the steps of diverting a component cooling fluid from a component cooling fluid source, through a cooling fluid transfer tube and toward the component, the cooling fluid transfer tube being disposed within a manifold extending circumferentially about a longitudinal axis and defining a plenum; diverting a plenum cooling fluid from a plenum cooling fluid source, through a cooling fluid passageway connected to the manifold and into the plenum; and allowing the plenum cooling fluid to circulate about the cooling fluid transfer tube.

In various embodiments, the manifold is disposed downstream of a rotor and the component is a rim section of the rotor. In various embodiments, the cooling fluid passageway extends through an exhaust guide vane disposed radially outward of the manifold. In various embodiments, the component cooling fluid source is disposed within a core flow of the compressor and the plenum cooling fluid source is disposed within a bypass flow of the gas turbine engine.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
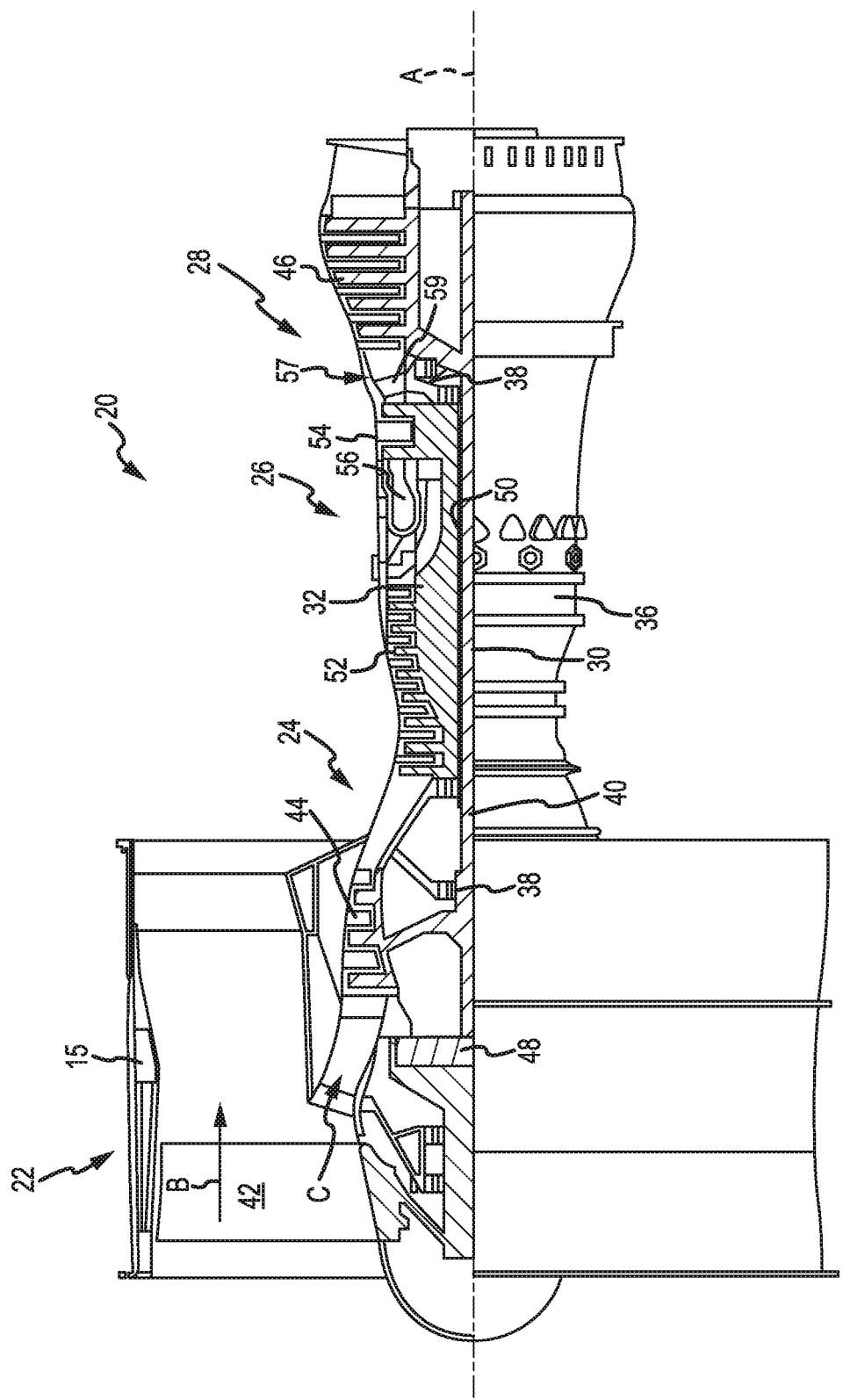
FIG. 1 is a schematic view of a gas turbine engine, in accordance with various embodiments.

Referring now to the drawings, FIG. 1A schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, while the compressor section 24 drives air along a primary or core flow path C for compression and communication into the combustor section 26 and then expansion through the turbine section 28. Although depicted as a two-spool turbofan gas turbine engine in the disclosed non-limiting embodiment, it will be understood that the concepts described herein are not limited to use with two-spool turbofans, as the teachings may be applied to other types of turbine engines, including three-spool architectures.

The gas turbine engine 20 generally includes a low speed spool 30 and a high speed spool 32 mounted for rotation about an engine central longitudinal axis A relative to an engine static structure 36 via several bearing systems 38. It should be understood that various bearing systems at various locations may alternatively or additionally be provided and the location of the several bearing systems 38 may be varied as appropriate to the application. The low speed spool 30 generally includes an inner shaft 40 that interconnects a fan 42, a low pressure compressor 44 and a low pressure turbine 46. The inner shaft 40 is connected to the fan 42 through a speed change mechanism, which in this gas turbine engine 20 is illustrated as a fan drive gear system 48 configured to drive the fan 42 at a lower speed than the low speed spool 30. The high speed spool 32 includes an outer shaft 50 that interconnects a high pressure compressor 52 and a high pressure turbine 54. A combustor 56 is arranged in the gas turbine engine 20 between the high pressure compressor 52 and the high pressure turbine 54. A mid-turbine frame 57 of the engine static structure 36 is arranged generally between the high pressure turbine 54 and the low pressure turbine 46 and may include airfoils 59 in the core flow path C for guiding the flow into the low pressure turbine 46. The mid-turbine frame 57 further supports the several bearing systems 38 in the turbine section 28. The inner shaft 40 and the outer shaft 50 are concentric and rotate via the several bearing systems 38 about the engine central longitudinal axis A, which is collinear with longitudinal axes of the inner shaft 40 and the outer shaft 50.

The air in the core flow path C is compressed by the low pressure compressor 44 and then the high pressure compressor 52, mixed and burned with fuel in the combustor 56, and then expanded over the high pressure turbine 54 and low pressure turbine 46. The low pressure turbine 46 and the high pressure turbine 54 rotationally drive the respective low speed spool 30 and the high speed spool 32 in response to the expansion. It will be appreciated that each of the positions of the fan section 22, the compressor section 24, the combustor section 26, the turbine section 28, and the fan drive gear system 48 may be varied. For example, the fan drive gear system 48 may be located aft of the combustor section 26 or even aft of the turbine section 28, and the fan section 22 may be positioned forward or aft of the location of the fan drive gear system 48.

Figure 2A:
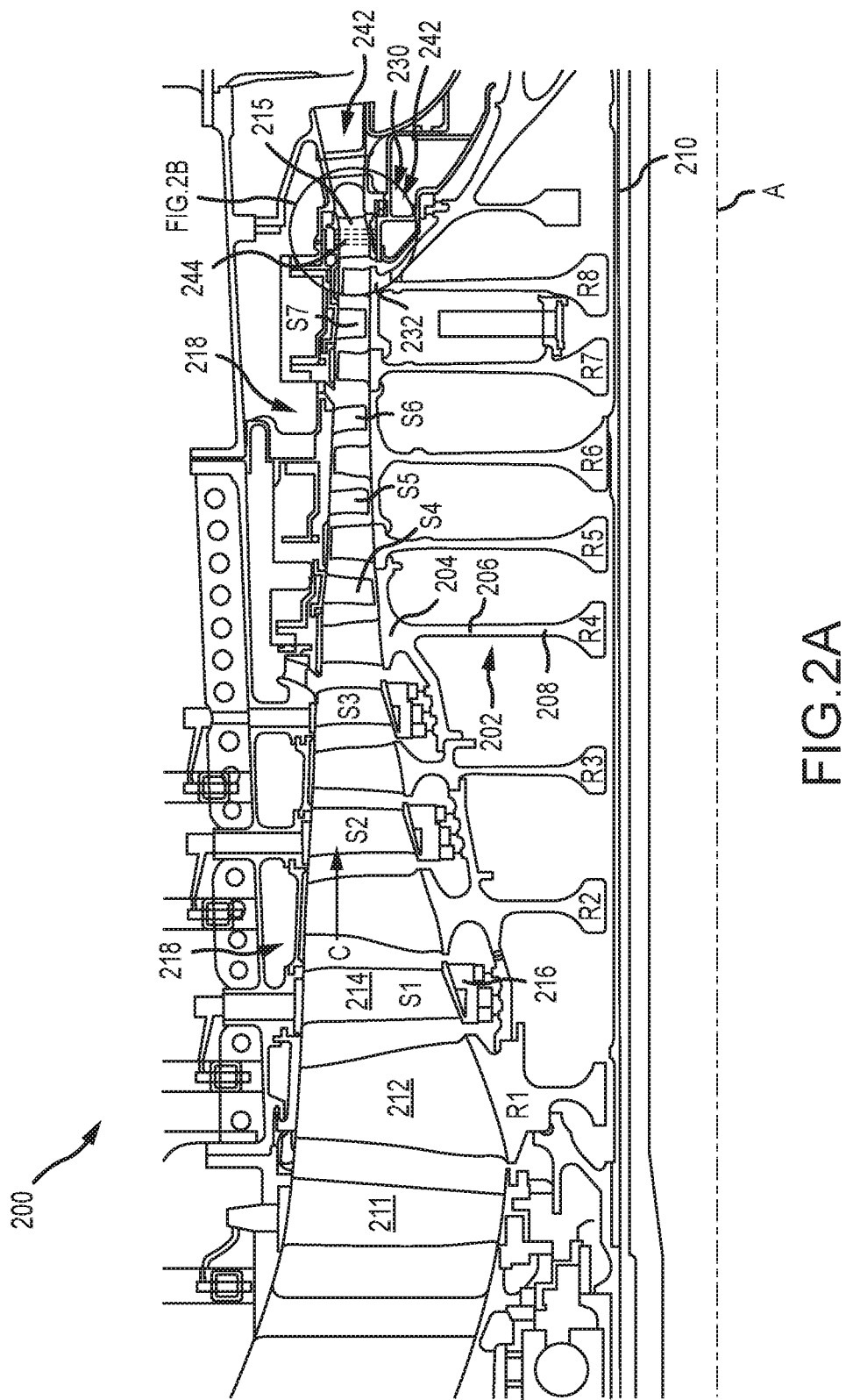
FIGS. 2A and 2B are schematic views of a high-pressure compressor section of a gas turbine engine, according to various embodiments.

Referring now to FIG. 2A, a section of a compressor is illustrated, according to various embodiments, such as a high pressure compressor 200 of a gas turbine engine. The high pressure compressor 200 includes a plurality of rotors 202 (e.g., rotors R1-R8), each having a rim 204, a disk 206 and a bore 208. In various embodiments, each of the plurality of rotors 202 is disposed on or connected to a high speed spool 210 configured to rotate about an engine central longitudinal axis A. A rotor blade 212 is secured to the rim 204 of each of the plurality of rotors 202, while a vane 214 is disposed between adjacent pairs of rotor blades. A vane inner shroud 216 is positioned radially inward of each vane 214. A plurality of stators (e.g., stators S1-S7) is formed by each vane 214 and its corresponding vane inner shroud 216. An alternating series of vane inner shroud 216 sections and rim 204 sections forms an inner diameter of a core flow path C. An outer casing 218 forms an outer diameter of the core flow path C. In various embodiments, the outer casing 218, together with each vane 214 and vane inner shroud 216 section, form a stationary structure, while the plurality of rotors 202 and each rotor blade 212 form a rotating structure. In various embodiments, the high pressure compressor 200 may further include a plurality of inlet guide vanes 211 positioned upstream of rotor R1 and a plurality of exhaust guide vanes 215, positioned downstream of rotor R8.

Air in the core flow path C traverses from left to right in FIG. 2A and increases in pressure and temperature at each stage of the high pressure compressor 200, ultimately exiting the high pressure compressor 200 by passing the plurality of exhaust guide vanes 215 after passing the blades connected to rotor R8. Significant variations in thermal energy levels at successively higher stages of the high pressure compressor 200 may occur, particularly within the latter stages of the high pressure compressor 200—e.g., in the proximity of the rim sections of rotors R7 and R8. In various embodiments, therefore, the high pressure compressor 200 may include a thermal management system 230 configured to direct a thermal management flow F, such as, for example, a component cooling fluid diverted from other locations of the compressor section or the gas turbine engine, at one or more components of a rotor assembly, such as, for example, a rim section 232 of rotor R8. More generally, the thermal management system 230 may be configured to direct the component cooling fluid to any area of the high pressure compressor 200 benefiting from thermal management, including component cooling.

Figure 2B:
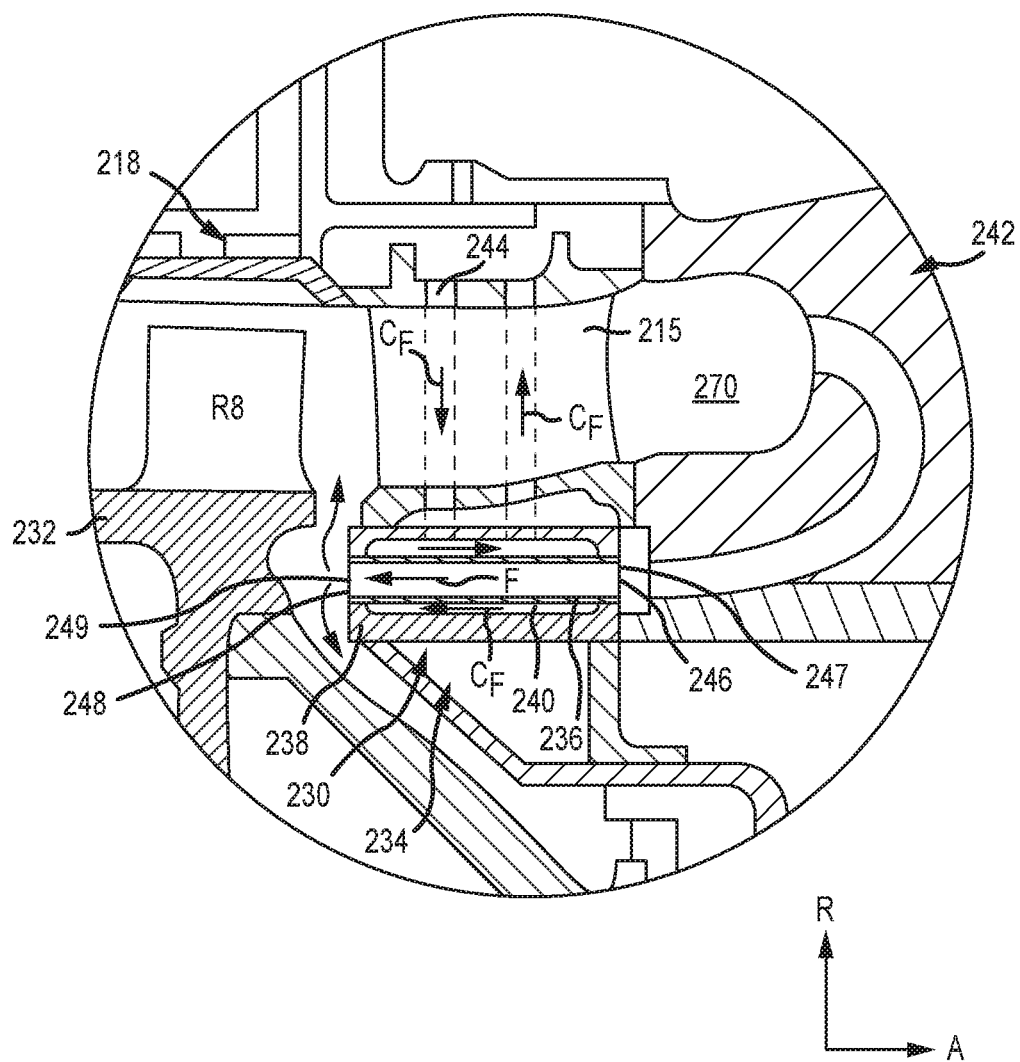

Referring now to both FIGS. 2A and 2B, in various embodiments, the thermal management system 230 may include a tangential onboard injector system 234 that is configured to provide a component cooling fluid to a component within the high pressure compressor 200. In various embodiments, the thermal management system 230 includes a plurality of component cooling fluid transfer tubes 236 disposed within a manifold 238. In various embodiments, the manifold 238 defines a plenum 240 that extends circumferentially about the engine central longitudinal axis A and surrounds each of the plurality of component cooling fluid transfer tubes 236.

In various embodiments, each of the plurality of component cooling fluid transfer tubes 236 includes a first component cooling tube end connected to a component cooling fluid source and a second component cooling tube end having an opening directed at the component. In various embodiments, the first component cooling tube end is a first axial component cooling tube end 246 disposed at a first axial end 247 of the manifold 238 and the second component cooling tube end is a second axial component cooling tube end 248 disposed at a second axial end 249 of the manifold 238. In various embodiments, the first axial end 247 is disposed on the manifold 238 downstream of the second axial end 249. In various embodiments, each of the plurality of component cooling fluid transfer tubes 236 is oriented within the manifold 238 to have an axial component (A) and a circumferential component (C), such that the vector components of the thermal management flow F also include axial and circumferential components. The axial and circumferential components are with respect to a radial (R), axial (A), and circumferential (C) coordinate system, as illustrated in FIG. 2B, where the axial component (A) is aligned with the engine central longitudinal axis A. As a result, the thermal management flow F is oriented to exit each of the plurality of component cooling fluid transfer tubes 236 in a substantially tangential manner relative to the rim section 232, which is rotating during operation of the high pressure compressor 200. Orienting the thermal management flow F in such a tangential manner relative to the rim section 232 facilitates efficient mixing of the thermal management flow F with the fluid proximate the surface of the rim section without generating excessive turbulence or pressure losses. To further facilitate such efficient mixing, the velocity of the thermal management flow F through each of the plurality of component cooling fluid transfer tubes 236 is matched with the rotational velocity of the rim section 232 of the rotor, e.g., the rim section of rotor R8.

As will be described below, in various embodiments, the thermal management flow F may be diverted from a component cooling fluid source, such as, for example, the core flow C at a plenum section 270 that exists downstream of the plurality of exhaust guide vanes 215 and upstream of a pre-diffuser 242 to a combustor section, such as, for example, the combustor section 26 described above with reference to FIG. 1. In various embodiments, the thermal management flow F may also be diverted from a component cooling fluid source outside the core flow C, such as, for example, a source positioned within the bypass flow B, described above with reference to FIG. 1. As will also be described below, in various embodiments, a plenum cooling fluid CF may be circulated within the plenum 240 defined by the manifold 238 in order to cool the thermal management flow F. In various embodiments, the plenum cooling fluid CF may be diverted from the core flow C at an upstream stage of the high pressure compressor 200 and, in various embodiments, the plenum cooling fluid CF may be diverted from a source external to the core flow C, such as, for example, the bypass flow B, described above with reference to FIG. 1. In various embodiments, the plenum cooling fluid CF may be supplied to and removed from the manifold 238 by one or more plenum cooling fluid passageways 244 extending through one or more of the plurality of exhaust guide vanes 215. In various embodiments, the one or more plenum cooling passageways may comprise tubes extending through or about other components of the high pressure compressor 200 that do not include one or more of the plurality of exhaust guide vanes 215. These and other embodiments are described further below with reference to FIGS. 3 and 4.

Figure 3:
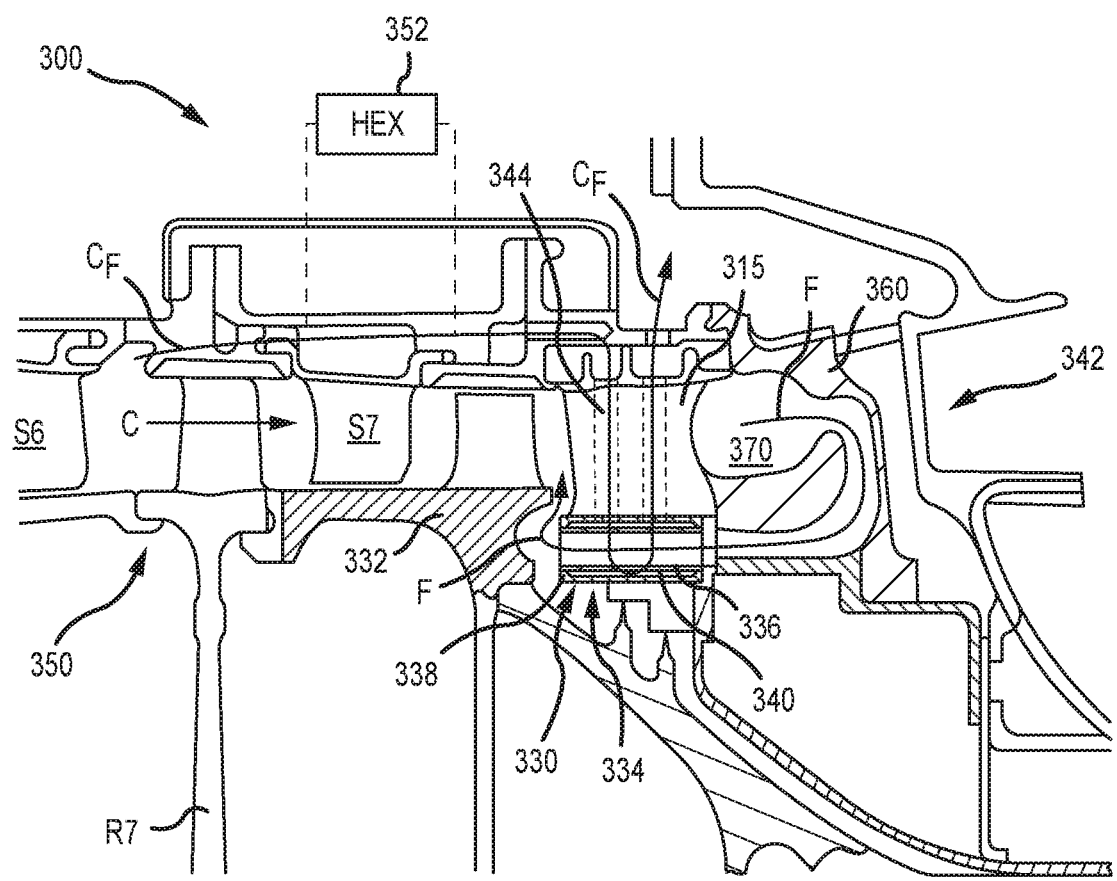
FIG. 3 is a schematic view of a high-pressure compressor section of a gas turbine engine, according to various embodiments.

Referring now to FIG. 3, an aft section of a high pressure compressor 300 is illustrated, in accordance with various embodiments. The high pressure compressor 300 includes a thermal management system 330, such as, for example, the thermal management system 230 described above with reference to FIGS. 2A and 2B. In various embodiments, the thermal management system 330 includes a tangential onboard injector system 334, that itself includes a plurality of component cooling fluid transfer tubes 336 disposed within a manifold 338 that defines a plenum 340 that extends circumferentially about an engine central longitudinal axis A and surrounds each of the plurality of component cooling fluid transfer tubes 336. In various embodiments, the tangential onboard injector system 334 shares many of the structural details and characteristics of the tangential onboard injector system 234 described above with reference to FIGS. 2A and 2B and, accordingly, such structural details and characteristics are not repeated here. In various embodiments, each of the plurality of component cooling fluid transfer tubes 336 is oriented within the manifold 338 to produce a thermal management flow F. The thermal management flow F is oriented to exit each of the plurality of component cooling fluid transfer tubes 336 in a substantially tangential manner relative to a rim section 332, which is rotating during operation of the high pressure compressor 300.

In various embodiments, the thermal management flow F is diverted from a core flow C at a plenum section 370 that exists downstream of a plurality of a plurality of exhaust guide vanes 315 and upstream of a pre-diffuser 342 to a combustor section, such as, for example, the combustor section 26 described above with reference to FIG. 1. In various embodiments, the thermal management flow F is routed through a thermal management flow tube 360 that extends from the core flow C downstream of the plurality of exhaust guide vanes 315 and upstream of a pre-diffuser 342 to a combustor section, such as, for example, the combustor section 26 described above with reference to FIG. 1. In various embodiments, a plenum cooling fluid CF is circulated within the plenum 340 defined by the manifold 338 in order to cool the thermal management flow F. In various embodiments, the plenum cooling fluid CF is routed to and from the manifold 338 by one or more passageways 344 extending through one or more of the plurality of exhaust guide vanes 315. In various embodiments, the plenum cooling fluid CF may be diverted from an upstream stage 350 of the high pressure compressor 300. As illustrated, the upstream stage 350 of the high pressure compressor 300 may comprise a region downstream of a stator S6 and upstream of a rotor R7, where such region has a similar counterpart to the region between the stator S6 and the rotor R7 described above with reference to FIG. 2A. In various embodiments, the upstream stage 350 may reside at any point of the high pressure compressor 300 where cooling flow may be bled from the core flow C. In various embodiments, the plenum cooling fluid CF that is bled or diverted from the core flow C at the upstream stage 350 of the high pressure compressor 300 may be diverted additionally through a heat exchanger 352, which, in various embodiments, may be disposed within a bypass flow, such as, for example, the bypass flow B described above with reference to FIG. 1.

Figure 4:
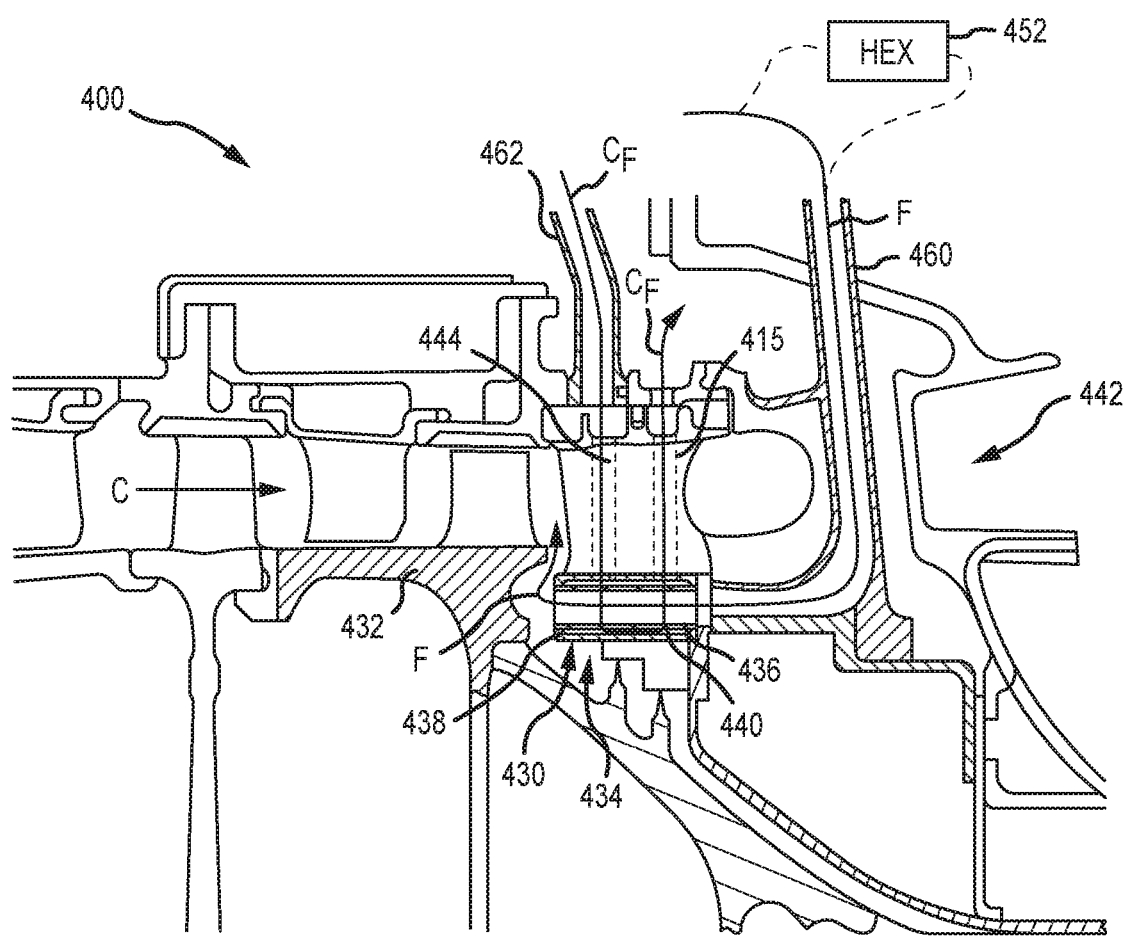
FIG. 4 is a schematic view of a high-pressure compressor section of a gas turbine engine, according to various embodiments.

Referring now to FIG. 4, an aft section of a high pressure compressor 400 is illustrated, in accordance with various embodiments. The high pressure compressor 400 includes a thermal management system 430, such as, for example, the thermal management system 230 described above with reference to FIGS. 2A and 2B. In various embodiments, the thermal management system 430 includes a tangential onboard injector system 434, that itself includes a plurality of component cooling fluid transfer tubes 436 disposed within a manifold 438 that defines a plenum 440 that extends circumferentially about an engine central longitudinal axis A and surrounds each of the plurality of component cooling fluid transfer tubes 436. In various embodiments, the tangential onboard injector system 434 shares many of the structural details and characteristics of the tangential onboard injector system 234 described above with reference to FIGS. 2A and 2B and, accordingly, such structural details and characteristics are not repeated here. In various embodiments, each of the plurality of component cooling fluid transfer tubes 436 is oriented within the manifold 438 to produce a thermal management flow F. The thermal management flow F is oriented to exit each of the plurality of component cooling fluid transfer tubes 436 in a substantially tangential manner relative to a rim section 432, which is rotating during operation of the high pressure compressor 400.

In various embodiments, the thermal management flow F is diverted from a core flow C, as described above with reference to FIG. 3, or from a region external to the core flow C, such as, for example, the bypass flow B described above with reference to FIG. 1. In various embodiments, the thermal management flow F is diverted from the core flow C and is diverted additionally through a heat exchanger 452, which, in various embodiments, may be disposed within a bypass flow, such as, for example, the bypass flow B described above with reference to FIG. 1. In various embodiments, the thermal management flow F is routed through a thermal management flow tube 460 that extends through the core flow C downstream of the plurality of exhaust guide vanes 415 and upstream of a pre-diffuser 442 to a combustor section, such as, for example, the combustor section 26 described above with reference to FIG. 1.

In various embodiments, a plenum cooling fluid CF is circulated within the plenum 440 defined by the manifold 438 in order to cool the thermal management flow F. In various embodiments, the plenum cooling fluid CF is routed to and from the manifold 438 by one or more passageways 444 extending through one or more of the plurality of exhaust guide vanes 415. In various embodiments, the plenum cooling fluid CF may be diverted from an upstream stage of the high pressure compressor 400, as described above with reference to FIG. 3, or from a region external to the core flow, such as, for example, the bypass flow B described above with reference to FIG. 1. In various embodiments, the plenum cooling fluid CF is routed through a cooling fluid tube 462 that carries the plenum cooling fluid CF, diverted, for example, from the core flow C or a bypass flow, to the one or more passageways 444 extending through the one or more of the plurality of exhaust guide vanes 415.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A thermal management system for a component of a gas turbine engine, comprising:
   a manifold extending circumferentially about a longitudinal axis and defining a plenum;
   a cooling fluid transfer tube disposed within the plenum and configured to transfer a component cooling fluid from a component cooling fluid source to the component; and a cooling fluid passageway directly connected to the manifold and configured to transfer a plenum cooling fluid from a plenum cooling fluid source to the plenum, wherein the cooling fluid passage directly feeds cooling fluid to the plenum, and wherein the component is a rim section of a rotor of a high pressure compressor and the cooling fluid passageway extends through an exhaust guide vane.

2. The thermal management system of claim 1, wherein the component cooling fluid source is disposed within a core flow of the high pressure compressor.

3. The thermal management system of claim 1, wherein the component cooling fluid source is a plenum section disposed downstream of an exhaust guide vane.

4. The thermal management system of claim 1, wherein the component cooling fluid source is disposed within a bypass flow of the gas turbine engine.

5. The thermal management system of claim 1, wherein the plenum cooling fluid source is disposed within a core flow of the high pressure compressor.

6. The thermal management system of claim 1, wherein the plenum cooling fluid source is disposed upstream of the rotor.

7. The thermal management system of claim 1, wherein the plenum cooling fluid source is disposed within a bypass flow of the gas turbine engine.

8. The thermal management system of claim 1, wherein the component cooling fluid source is disposed within a core flow of the high pressure compressor and the plenum cooling fluid source is disposed within a bypass flow of the gas turbine engine.

9. The thermal management system of claim 8, further comprising a heat exchanger disposed within the bypass flow and configured to cool the component cooling fluid.

10. A compressor, comprising:
a rotor configured to rotate about a longitudinal axis;
a manifold extending circumferentially about the longitudinal axis and defining a plenum, the manifold disposed downstream of the rotor and radially inward of an exhaust guide vane;
a cooling fluid transfer tube disposed within the plenum and configured to transfer a component cooling fluid from a component cooling fluid source to a component of the rotor; and
a cooling fluid passageway extending through the exhaust guide vane and configured to transfer a plenum cooling fluid from a plenum cooling fluid source to the plenum, wherein the cooling fluid passageway is directly connected to and feeds the plenum, and wherein the cooling fluid transfer tube includes a first axial cooling tube end and a second axial cooling tube end, the component of the rotor is a rim section and the component cooling fluid source is disposed within a core flow of the compressor and the plenum cooling fluid source is disposed within a bypass flow of a gas turbine engine.

11. The compressor of claim 10, further comprising a heat exchanger disposed within the bypass flow and configured to cool the component cooling fluid.

12. A method of cooling a component within a compressor of a gas turbine engine, comprising:
diverting a component cooling fluid from a component cooling fluid source, through a cooling fluid transfer tube and toward the component, the cooling fluid transfer tube being disposed within a manifold extending circumferentially about a longitudinal axis and defining a plenum;
diverting a plenum cooling fluid from a plenum cooling fluid source, through a cooling fluid passageway directly connected to the manifold and directly into the plenum; and
allowing the plenum cooling fluid to circulate about the cooling fluid transfer tube,
wherein the manifold is disposed downstream of a rotor and the component is a rim section of the rotor and the cooling fluid passageway extends through an exhaust guide vane disposed radially outward of the manifold.

13. The method of claim 12, wherein the component cooling fluid source is disposed within a core flow of the compressor and the plenum cooling fluid source is disposed within a bypass flow of the gas turbine engine.

* * * * *